(12) United States Patent
Aliev et al.

(10) Patent No.: US 6,900,425 B1
(45) Date of Patent: May 31, 2005

(54) SYSTEM FOR ILLUMINATING AN OBJECT

(76) Inventors: Abdulla Sirazhutdinovich Aliev, Pervi Sadoviy Peurulok-8B, 367020 Makiiachkala (RU); Said Dzhaparovich Amirov, Ulastemirova, DOM 3, KV.1, 367025 Makhachkala (RU)

( * ) Notice: Subject to any disclaimer, the term of this patent is extended or adjusted under 35 U.S.C. 154(b) by 0 days.

(21) Appl. No.: 09/980,157

(22) PCT Filed: Apr. 21, 2000

(86) PCT No.: PCT/RU00/00144

§ 371 (c)(1),
(2), (4) Date: Jun. 11, 2002

(87) PCT Pub. No.: WO00/75679

PCT Pub. Date: Dec. 7, 2000

(30) Foreign Application Priority Data

May 28, 1999 (RU) .......................................... 99111294

(51) Int. Cl.[7] .............................. G01J 1/20; G01B 11/26
(52) U.S. Cl. ................................ 250/201.1; 250/203.1; 356/152.1
(58) Field of Search .......................... 250/201.9, 203.1; 342/52–58; 356/151.1–152.3

(56) References Cited

U.S. PATENT DOCUMENTS

| 3,744,740 A | * | 7/1973 | Godin et al. ................ 244/3.19 |
|---|---|---|---|
| 4,158,840 A | * | 6/1979 | Schwab ......................... 342/52 |
| 4,477,814 A | * | 10/1984 | Brumbaugh et al. ......... 343/725 |
| 4,780,719 A | * | 10/1988 | Frei et al. ...................... 342/53 |
| 5,134,409 A | | 7/1992 | De Groot |
| 5,216,236 A | | 6/1993 | Blais |
| 5,265,034 A | * | 11/1993 | Breckenridge et al. .. 250/201.1 |

FOREIGN PATENT DOCUMENTS

| GB | 1295125 | 11/1972 |
|---|---|---|
| RU | 2101724 | 1/1998 |

* cited by examiner

*Primary Examiner*—Stephone B. Allen
(74) *Attorney, Agent, or Firm*—Collard & Roe, P.C.

(57) ABSTRACT

A system for lighting an object has a radiation source, a first guidance device optically connected to the object, a second guidance device and a first subtracting amplifier in communication with the first guidance device. The first subtracting amplifier has inputs and at least one output. A second subtracting amplifier is in communication with the first and second guidance devices. A commutation unit is in communication with the first and second guidance devices and the first and second subtracting amplifiers. First, second, third and fourth actuators are in communication with the commutation unit. A first mirror is in communication with and controlled by the first and second actuators and a second mirror is in communication with and controlled by the third and fourth actuators. The first and said second mirrors are controlled by the actuators so that the system can light an object by reflecting the radiation source.

12 Claims, 10 Drawing Sheets

SYSTEM FOR ILLUMINATING AN OBJECT

CROSS REFERENCE TO RELATED APPLICATIONS

Applicants claim priority under 35 U.S.C. §119 of Russian Application No. 99111294 filed May 28, 1999. Applicants also claim priority under 35 U.S.C. §120 of PCT/RU00/00144 filed Apr. 21, 2000. The international application under PCT article 21(2) was not published in English.

TECHNICAL FIELD

The invention relates to navigational engineering, more specifically, to optoelectronic systems for autotracking of moving objects.

BACKGROUND ART

Known in the present state of the art are systems for automatic guidance and tracking of moving targets, which are based on the frequency, phase, pulse-height, time-pulse and amplitude-phase principles and can be used for illumination of objects (cf. L. Z. Kriksunov, I. F. Usoltsev. Infrared systems. Moscow, "Sovetskoye Radio" Publishing House, 1968, p.p. 157–239 (in Russian).

Known coordinators (target seekers) generate signals, which are proportional to the constituents of the angle of misalignment in two mutually perpendicular planes of control. These signals go to the monitoring drive of the system for target autotracking, which keeps the coordinator's optical system operating in a mode to have the optic axis constantly directed towards a target.

Insofar as modulation of the radiant flux is performed mechanically with the aid of a modulating disk which is disposed in the focal plane of a lens and rotated by an electric motor at a constant speed, the known system fails to provide high accuracy of measuring angular coordinates of the target.

There also exists a two-gimbal suspension with a diverting mirror for a precision optical tracking system developed by the TRW firm and intended to be used as part of an optical tracking system (cf. I. I. Shumeiko (editor). Astronautics and rocket dynamics. Express information, No 43, Moscow, 1989, p.p. 27–34 (in Russian).

This device consists of a gimbal joint of flexible suspension, four electrodynamic drives, a caging gear, a device of signal leveling for integration with a capacitive pickup of the shift, and an electronic unit. A capacitive sensor serves for generating signals of angular misalignment along two axes. On both sides of the outer gimbal ring there are two actuators of the detention system.

Mobile electromechanical clusters cause low reliability and low-speed response of the above-mentioned coordinators.

Besides, their construction does not allow directing mirror-reflected beams along their optic axes and, moreover, these target seekers are capable of tracing targets only within the immediate field of their vision and stop operating when the target is not seen, for they are not designed for operating in the search mode.

The closest device (the prototype) of the proposed invention as to a combination of features is a device for location of two-dimensional coordinates of an object (a target seeker) (cf. DE Application #A 3,412,0763). The prototype has the first and second ruled optoelectronic converters with the image-transforming optics; the inputs of these converters are connected to the output of the synchro generator, while their outputs, to the inputs of the corresponding search signal detectors (threshold elements).

The ruled optoelectronic converters are mutually perpendicular, so that rotation axes of the objects should pass through optical centers of the cylinder lenses.

On mutual lag (misalignment) of the strobe pulse and the target signal, control signal conditioners produce control signals, whose signs and values are proportional to the angular coordinates of the target in two mutually perpendicular planes of control.

Yet, the known optoelectronic target seeker fails to point the beam at an object and seek for a target if the object is beyond its field of vision.

SUMMARY OF THE INVENTION

The present invention has for its object to provide a system for lighting an object, said system ensuring a higher measuring accuracy of the angular coordinates of a target due to beam pointing at the center of the target image.

One more object of the invention is to extend the functional capabilities of the system by enabling it to search for a ground target and to light it from the outer space.

The aforesaid objects of this invention are accomplished due to the fact that the system for lighting an object comprising a first guidance device further comprises a second guidance device optically connected to the source of radiation, the first and the second subtracting amplifiers, the first and the second actuators, and a mirror. The first outputs of the first and second guidance devices are connected to the corresponding inputs of the first subtracting amplifier, while their second outputs, to the corresponding inputs of the second subtracting amplifier. The outputs of the first and second subtracting amplifier are connected to the inputs of the corresponding actuators kinematically coupled to the mirror.

The first and third guidance devices are of identical circuit design and actuate the target seeker, the search signal conditioner, the first and second angular position pickups, commutators, the third and fourth actuators, cinematically linked to a target seeker, and the angular position pickups, all other being electrically connected to one another.

BRIEF DESCRIPTION OF THE DRAWINGS

Further objects and advantages of the present invention will become obvious from a detailed description of the system for lighting an object and the accompanying drawings, wherein.

DETAILED DESCRIPTION OF THE INVENTION

Figure 1:
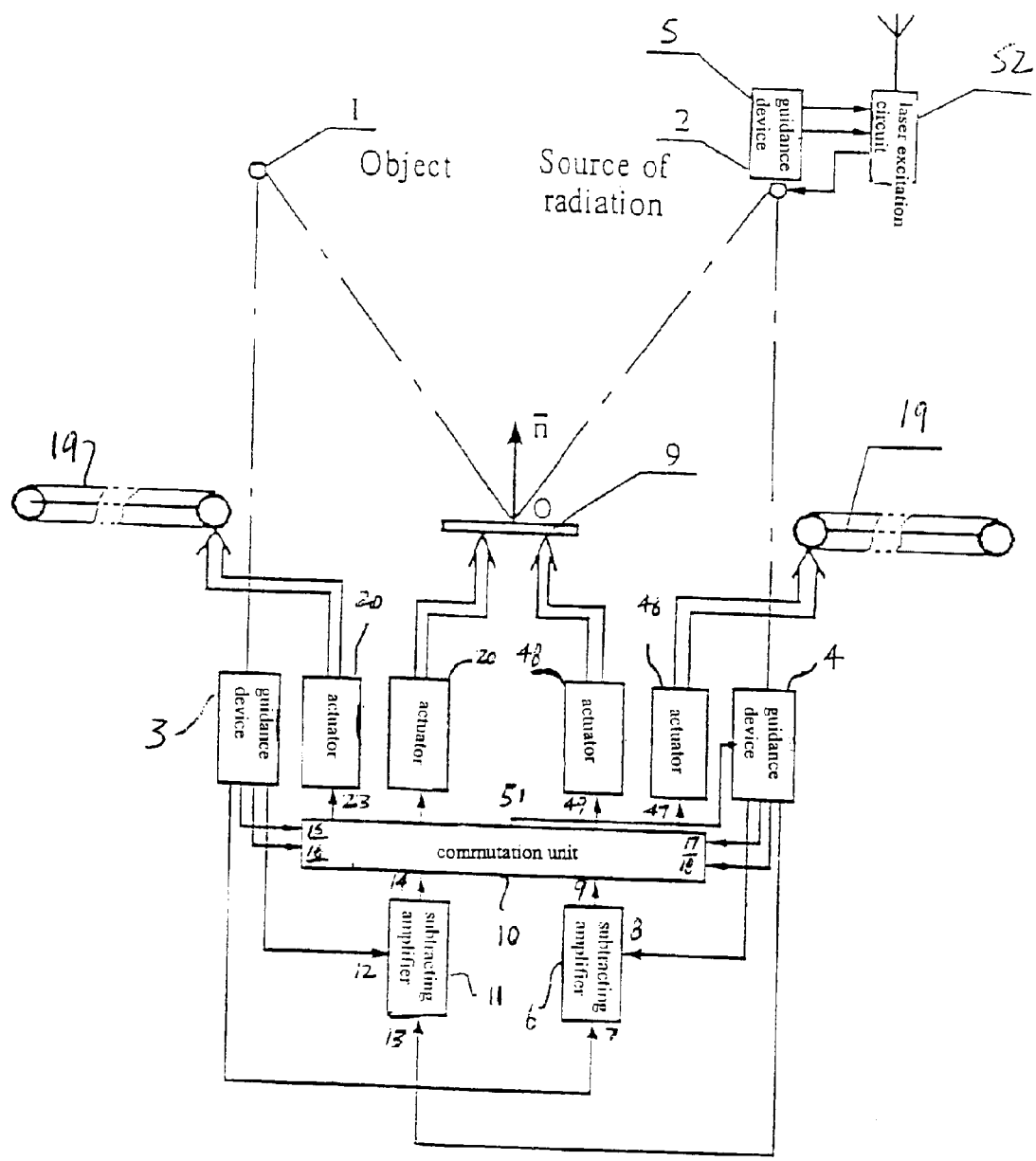
FIG. 1 is a block diagram of the lighting system, according to the invention.

The system for lighting an object 1 (FIG. 1) comprises a radiation source 2 and guidance devices 3, 4, 5, of which the guidance device 3 is optically connected to the object 1, and the device 4, to the radiation source 2. The system further comprises a subtracting amplifier 6 having its inputs 7 and 8 connected to the respective outputs of the guidance devices 3 and 4, while the output thereof is connected to an input 9 of the commutation unit 10, and a subtracting amplifier 11 whose inputs 12 and 5 are connected to the outputs the guidance devices 3 and 4, respectively, and its output is connected to an input 14 of the commutation unit 10. Inputs 15 and 16 of the commutation unit 10 are connected to the corresponding outputs of the guidance device 3, while its inputs 17 and 18 thereof are connected to the respective outputs of the guidance device 4. In addition, the system comprises a mirror 19 with which kinematically coupled are actuators 20 having their inputs connected to an output 23 of the commutation unit 10, as well as a mirror 19 with which kinematically coupled are actuators 46 connected to an output 47 of the commutation unit 10 and actuators 48 having their input connected to an output 49 of commutation unit 10. An output 51 of commutation unit 10 is connected to the input of the guidance device 4. The radiation source 2 is a laser disposed on guidance device 5 and connected to a laser excitation circuit 52 whose input are connected to the respective outputs of the guidance device 5.

Figure 2:
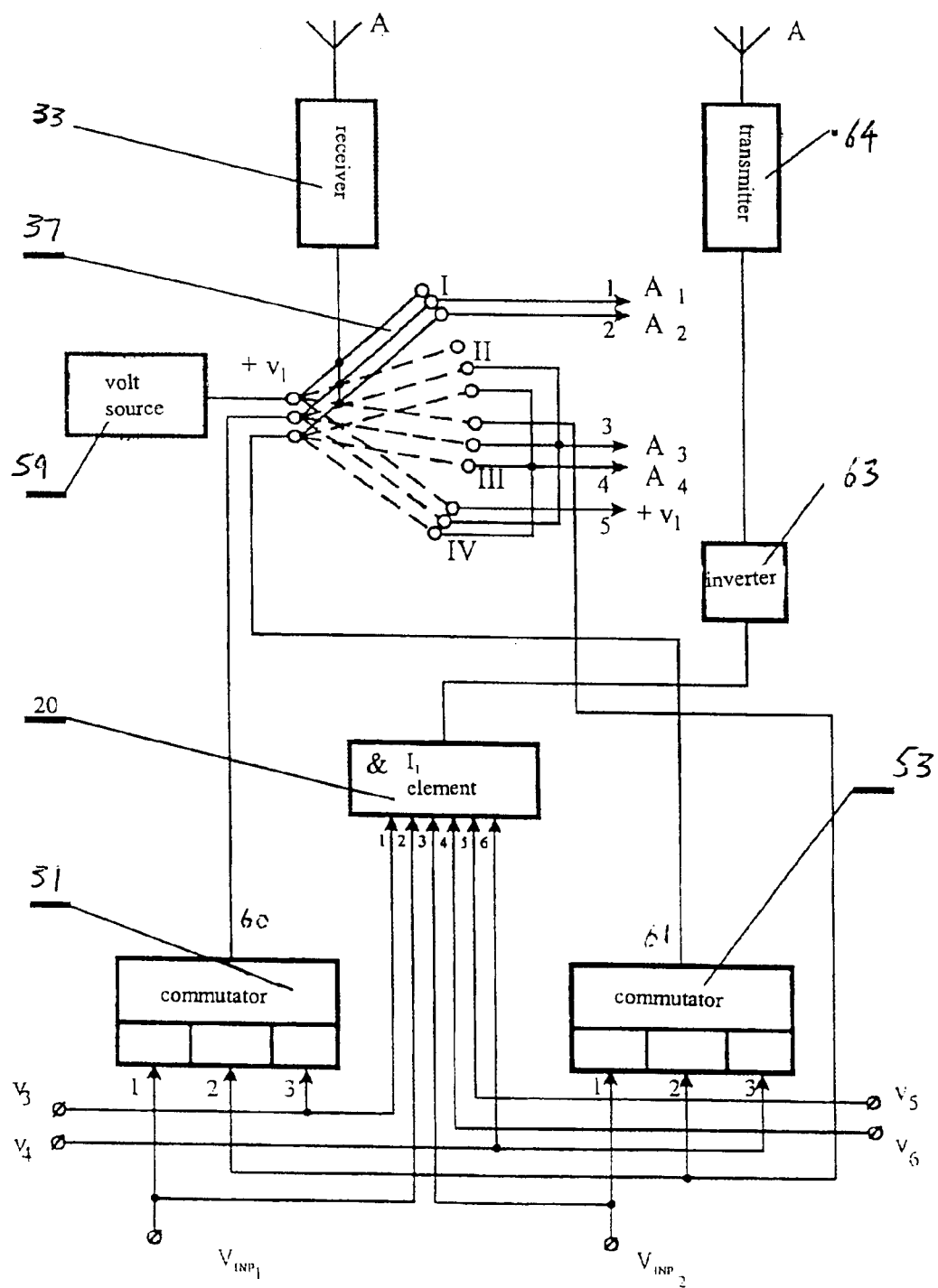
FIG. 2 is a functional diagram of the commutation unit.

The commutation unit 10 comprises commutators 31 and 53 (FIG. 2) having one of the inputs thereof serving as respective inputs 15, 47, 9, and 14 of commutation unit 10, a radio receiver 33 with an antenna A, said receiver being connected to three contacts 55, 56, and 36 of a four-position radio-controlled switch 37 through which an output 21 and the output 47 of the commutation unit 10 are connected to the output of the commutator 31, and the output 23 and an output 49 of the commutation unit 10 are connected to the output of the commutator 53. The commutation unit 10 comprises also a unit signal source 59 whose output being connected, when the contacts 55, 56, 36 of the switch 37 in position IV, to the output 51 of the commutation unit 10, and when the switch in position III, to parallel-connected inputs 60 and 61 of the respective commutators 31 and 53. In addition, the contacts 56 and 36 of the contacts 55, 56, 36 of the switch 37 with its being in positions II, III, and IV are parallel-connected. The commutation unit 10 further comprises an AND gate 62 having its inputs connected to the inputs 9, 14, 15, 16, 17, and 18 of the commutation unit 10, and its output connected, through an inverter 63, to a radio transmitter 64.

Figure 3:
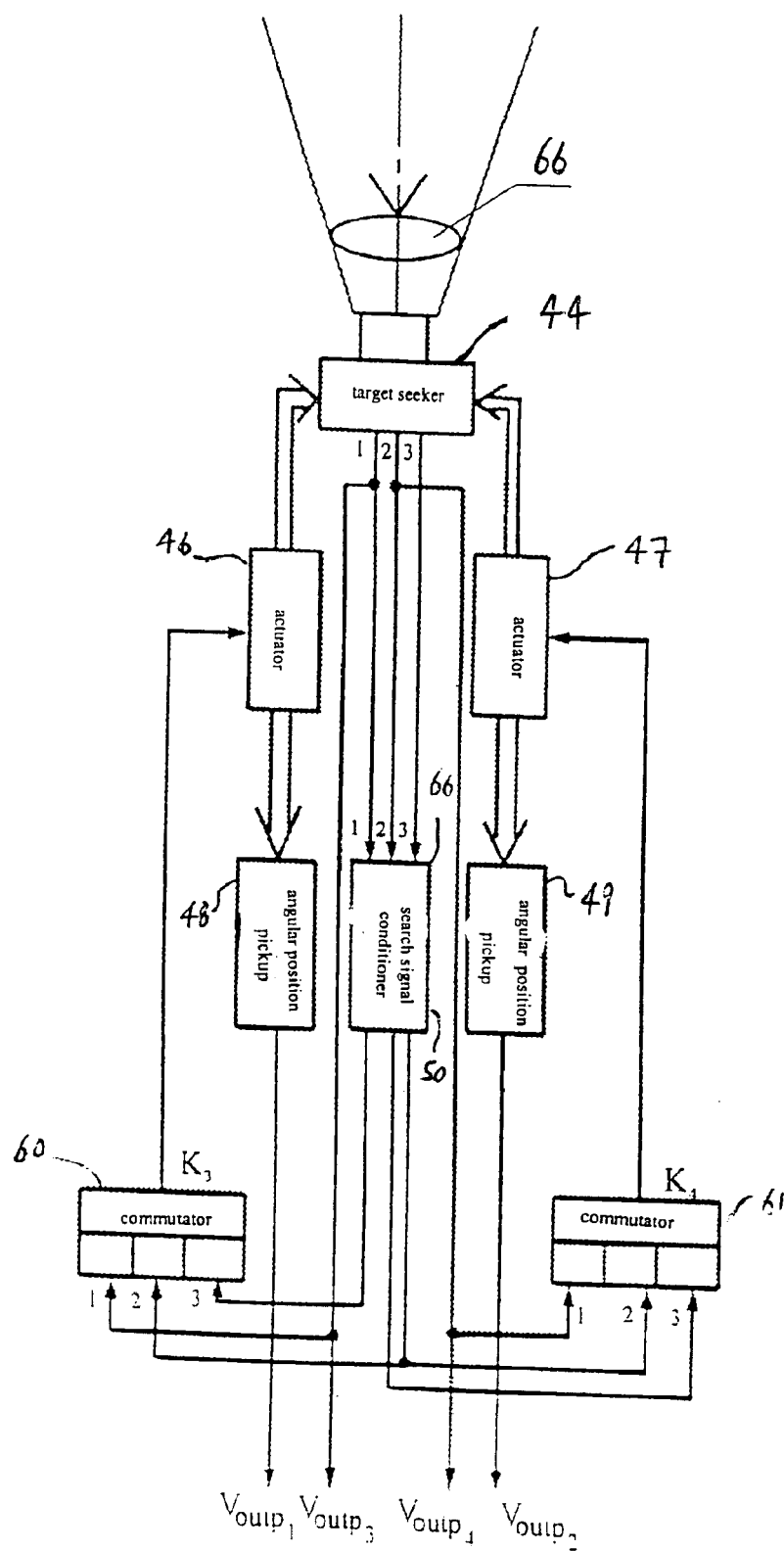
FIG. 3 is a block diagram of two guidance devices (3, 13)

FIG. 3 presents a block-diagram of the guidance device 3 or 5, each comprising kinematically coupled a target seeker 44 carrying a light marker 66 (or corner reflector), actuators 46 and 47, and angular position pickups 48 and 49 whose outputs are in fact the respective outputs of the guidance device 3 or 5. The pickups 48 and 49 may appear as, e.g., synchro transmitters or potentiometers. Furthermore, each guidance device 3 or 5 comprises a search signal conditioner 50 connected respectively through its outputs to the outputs of the target seeker 44, one of said outputs serving as respective outputs of the guidance device 3 or 5. One of the outputs of the search signal conditioner 50 is connected to one of the inputs of a commutator 60, its second output, to one of the inputs of a commutator 61, and a third output of the search signal conditioner 50 is connected to the parallel-connected other inputs of the commutators 60 and 61 whose outputs are connected to the inputs of the actuators 46 and 47. Besides, one of the inputs of the commutators 60 and 61 are connected to respective outputs of the target seeker 44.

The guidance device 4 (FIG. 4) comprises kinematically coupled a target seeker 53 carrying a light marker 54 (or corner reflector), actuators 55 and 56, and angular position pickups 57 and 58 whose outputs are in fact the respective outputs of the guidance device 4, as well as commutators 59, 60, 61, 62, 63, 64, and 44 and a search signal conditioner 66. One inputs of the commutators 59, 60, and 61 are connected to the corresponding outputs of the target seeker 53, while the other inputs of said commutators are parallel-connected to the corresponding inputs of the commutators 64 and 44 and serve in fact as the commutation input of the guidance device 4. In addition, the outputs of the commutators 59, 60, and 61 are connected respectively to the inputs of the search signal conditioner 66 two outputs of which are connected to the corresponding inputs of said commutators, and a third output thereof is connected to the parallel-connected inputs of said commutators 62 and 63. Other inputs of the commutators 62 and 63 are connected to the outputs of the commutators 64 and 44 whose inputs are connected respectively to the outputs of the target seeker 53.

Figure 5:
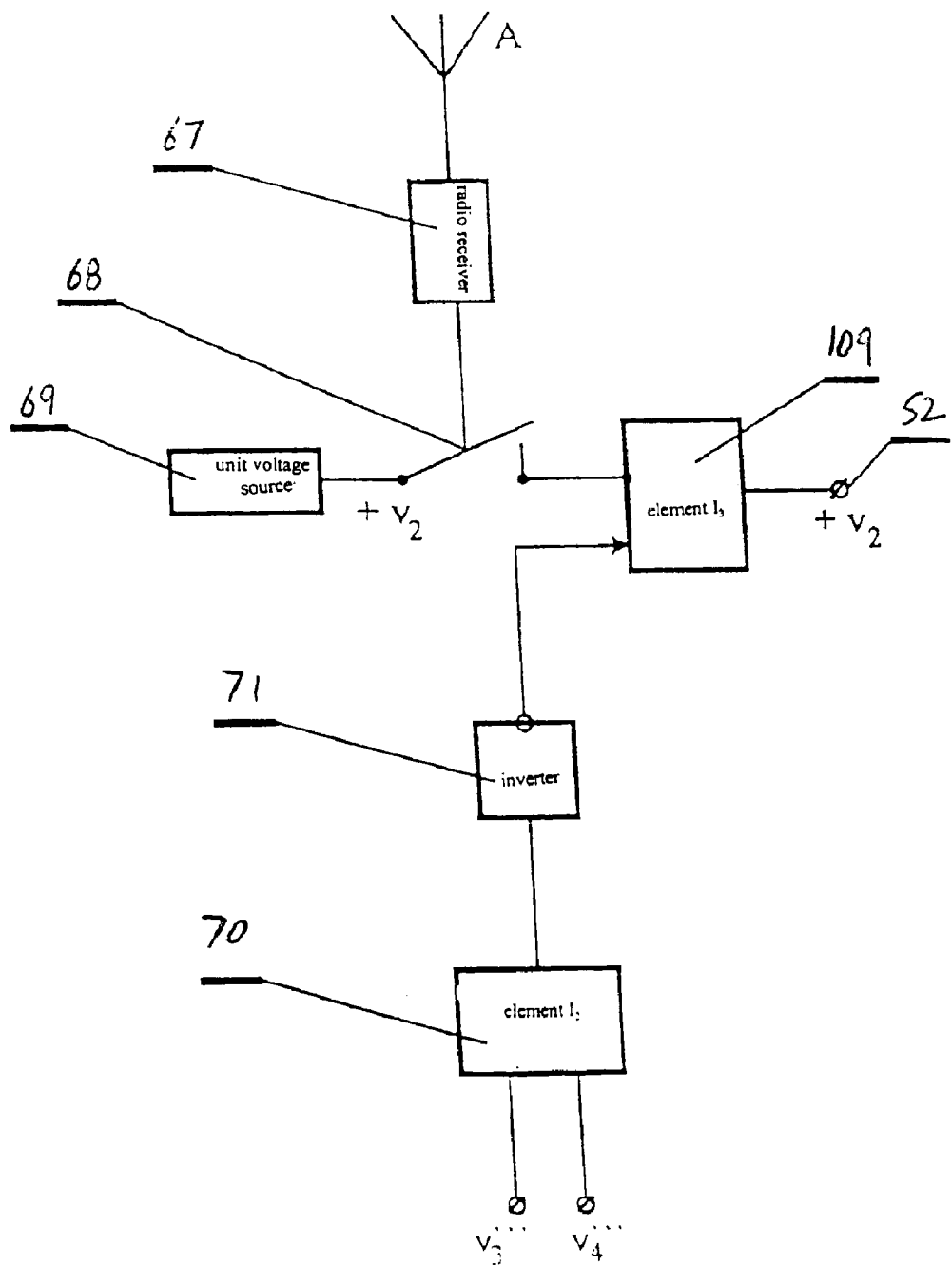
FIG. 5 is a pulse laser excitation circuit.

FIG. 5 displays a pulsed laser excitation circuit, comprising a radio receiver 67 with an antenna, a remotely controlled switch 68 connected to the output of a unit signal source 69, as well as series-connected AND gate 70, NOT (inverter) gate 71, and an AND gate 109. One of the inputs of the AND gate 109 is connected, via the switch 68, to the output of the unit signal source 69, while the output of the AND gate 109 is in fact the output of the laser excitation circuit 52 (FIG. 1). Besides, the inputs of the AND gate 70 (FIG. 5) are in effect the inputs of the laser excitation circuit 52 (FIG. 1) connected to the outputs of the guidance device 5.

Figure 6:
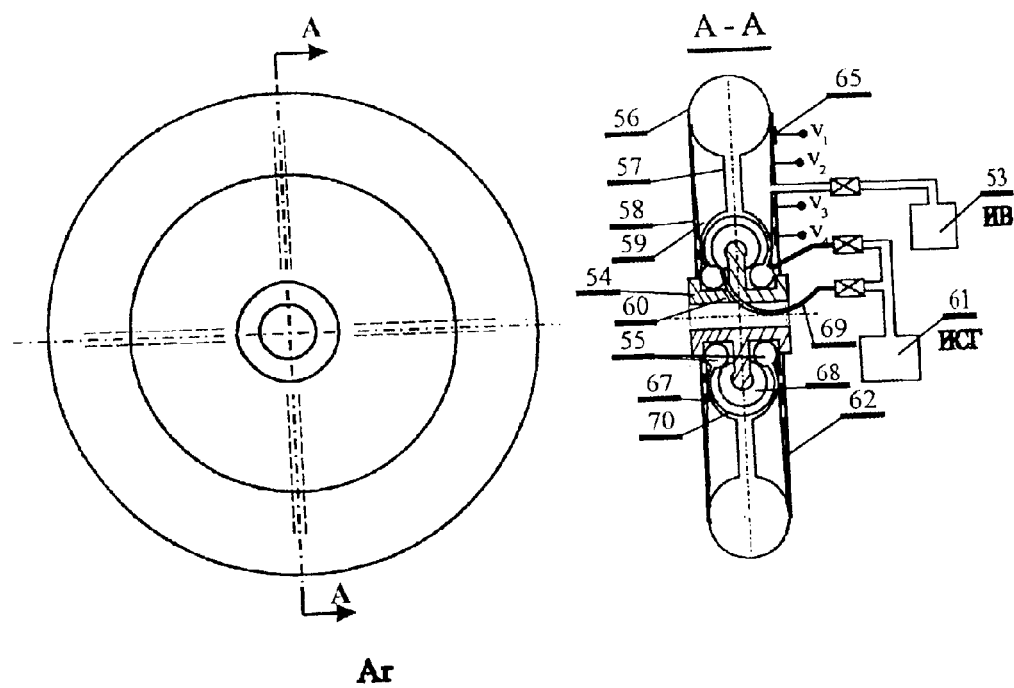
FIG. 6 shows the construction of one of the mirrors.

The film mirror 19 (FIG. 6) comprises a locating ring 110 with limiters, an internal pneumatic chamber 74 and external pneumatic chamber 75 communicating with each other through radial tubes 76 appearing as, e.g., hoses, as well as with a source 77 of compressed gas through a gas conduit 78 appearing as, e.g., a hose wherein a valve 79 is provided. The pneumatic chambers 74 and 75 and radial tubes 76 are associated with an elastic reflecting sheet 106 consisting of an elastic dielectric film 107 to which a light-reflecting metallic (e.g., aluminum) layer 109 is applied.

The film mirror 19 may further comprise an elastic reflecting sheet 110 which is positioned at a specified distance from the reflecting sheet 106, while the metallic layers of the sheets 106 and 110 are connected to the opposite poles of an emf source 111. The reflecting sheets 106 and 110 together with the pneumatic chambers 74 and 75 establish a pressure-tight low-pressure cavity communicating with a source 112 of vacuum.

Furthermore, the internal pneumatic chamber 74 may made up of two pneumatically intercommunicating sections interconnected by a corrugated band so as to be mutually displaceable, and the metallic layer of the reflecting sheet 110 may appear as concentric rings 87 insulated from each other and connected to sources 108 of controlled voltage. A spring shaped as a clamp 89 is put from above onto the corrugated band 86, and a pneumatic chamber 90 is placed in the interior space of said spring and communicating, via an individual gas conduit 91, to the source 77 of compressed gas.

Figure 7:
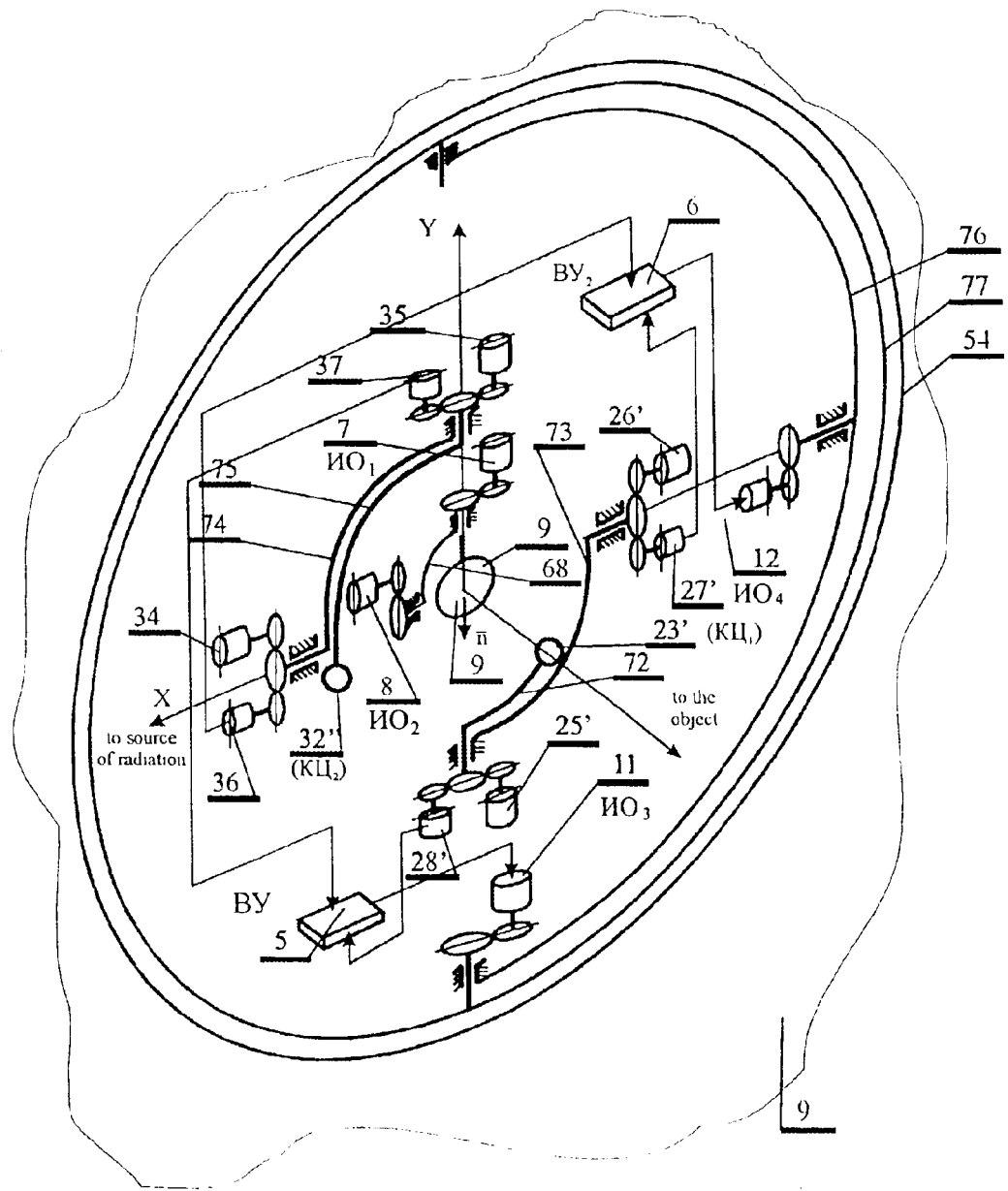
FIG. 7 shows combined kinematic and optical diagrams of the system.

FIG. 7 presents combined kinematic and optical diagrams of the system, wherein the target seeker 44 of the guidance device 3 makes the search of an object 1 with the aid of brackets 109 and 110 of the actuators (servomotors) 46 and 47 whose angular positions are determined by the angular position pickups (synchro transmitters or potentiometers) 48 and 49. The target seeker 53 is directed towards the source of radiation (the Sun) by brackets 94 and 95 mechanically associated with the respective shafts of the actuators (servomotors) 55 and 56 whose angular positions are determined by the angular position pickups of the guidance device 4.

The mirror 19 is installed on an internal frame 96 of a first gimbal mount whose external frame 97 is kinematically coupled to the actuators 22.

The mirror 19 is installed on a second gimbal mount composed of an internal frame 98 and an external frame 99, respectively, and is held in position on the ring 110 which in turn is locked-in with the external frame 99 of the second gimbal mount whose position with respect to the internal frame is adjustable with the aid the actuators (servomotor) 46. The internal frame 98 is adjustable for position with respect to the gyro-stabilized platform with the aid of the actuators 48.

Figure 8:
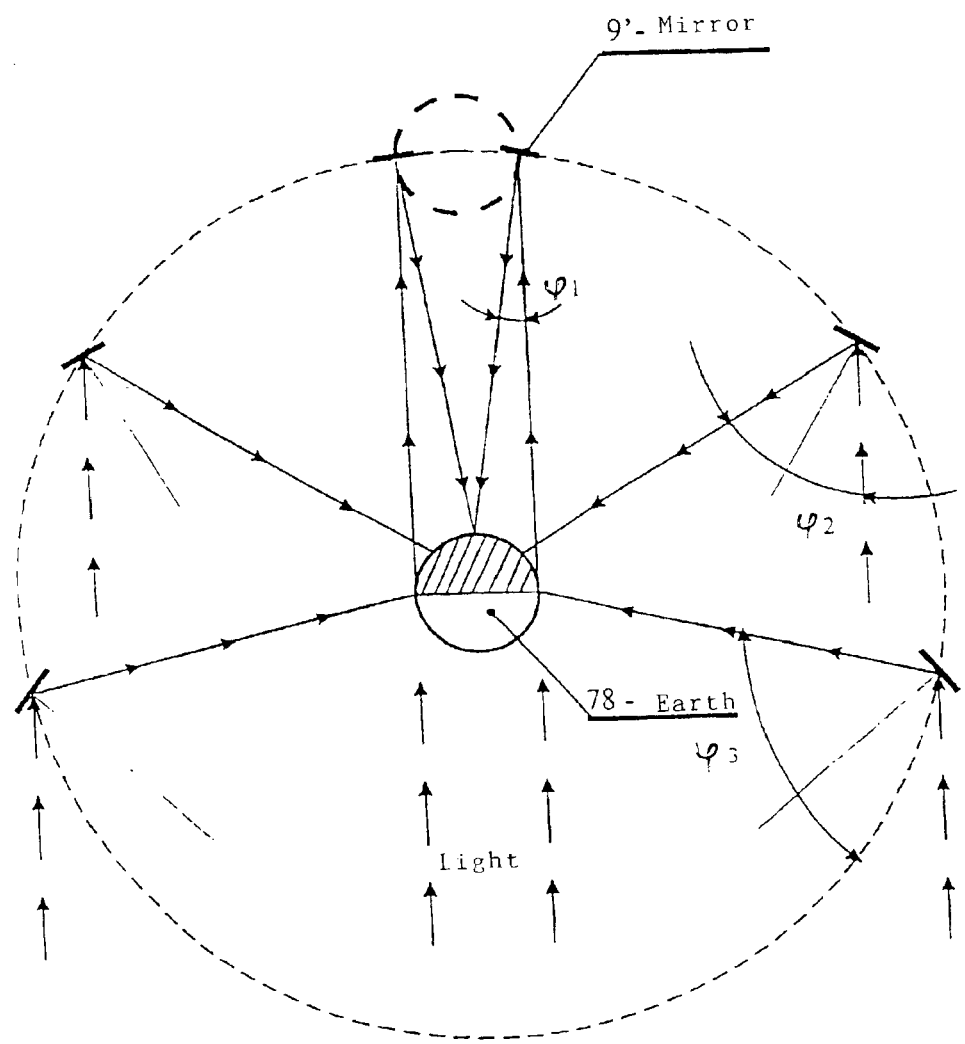
FIG. 8 shows different positions of the mirror ($ц_1$ ч $ц_6$) about its axis in relation to the Earth.

FIG. 8 shows various positions of the mirror 19 ($\phi 1$–$\phi 2$) rotating about its own axis, relative to the Earth 100.

The search signal conditioner 50 or 66 (FIG. 9) comprises a logic element (gate) 101 whose inputs 102, 103, and 104 serve as the inputs of the search signal conditioner 50 or 66, of which the input 104 is a sync input. The search signal conditioner 50 or 66 further comprises a generator 105 of linearly varying voltage, said generator having its zeroing input connected to the output of the logical unit 101 and its output, to the parallel-connected control inputs of amplitude modulators 106 and 107 whose other inputs are connected to the respective outputs of a quadrature generator 108 and the outputs of said modulators are connected respectively to one inputs of summers 109 and 110 the other inputs of which are connected to the respective outputs of sampling-and-storage devices 111 and 112 whose data inputs are connected to the outputs of the summers 109, 110 which are also connected to the inputs of analog-to-digital converters 15 and 114, respectively. The record permitting inputs of the sampling-and-storage devices 111 and 112 are connected in parallel to each other and also connected to the output of the logical unit 101. The outputs of the analog-to-digital converters 15 and 114 and the output of the logical unit 101 are in fact the respective outputs of the search signal conditioner 50 or 66.

Figure 10:
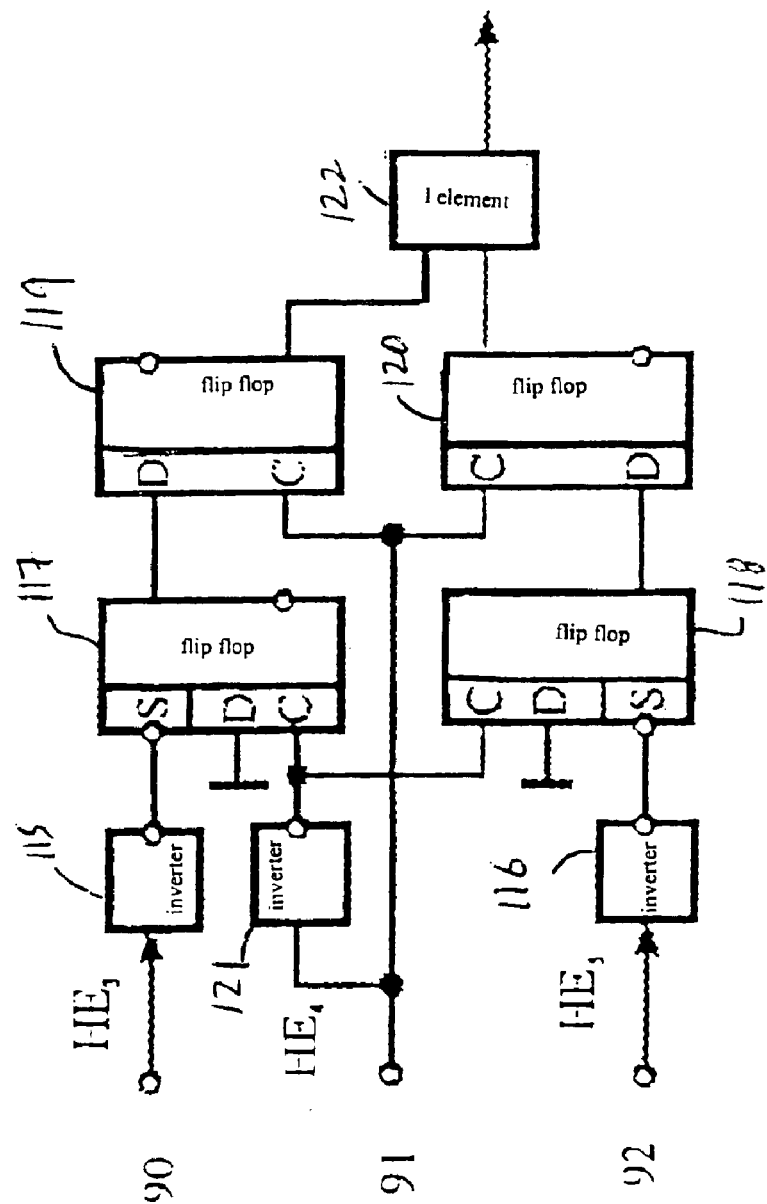
FIG. 10 is a functional diagram of the logical unit.

FIG. 10 displays a functional diagram of the logical unit 101 which comprises inverters 115 and 116 whose outputs are connected to the respective sync set inputs of flip-flops 117 and 118 having their outputs connected to the D-inputs of flip-flops 119 and 120. The C-inputs of the flip-flops 117 and 118 are integrated and connected to the output of an inverter 121 whose input is connected to the C-inputs of the flip-flops 117 and 118. The logical unit 101 further comprises an AND gate 122 connected through its inputs respectively to the outputs of the flip-flops 119 and 120, the output of said AND gate 122 is also the output of the logical unit 101. The inputs of the inverters 115 and 116 are the respective inputs of the logical unit 101, and the input of the inverter 116 is in fact the sync input thereof.

The system for lighting an object operates as follows.

For illumination of cities situated in the area of middle latitudes and at the equator, the system for illumination should be installed on a gyrostabilized platform placed in a stationary orbit with an altitude about 36,000 km. Fixity of the satellite, which is carrying the system of the mirror guidance, in relation to the ground object adds to the advantages of the project.

High altitude of the stationary orbit permits to light a number of selected ground objects with the aid of a single system.

From a satellite in the stationary orbit a vast area of the Earth can be seen that extends for ±60° from the west to the east and for ±70° from the north to the south.

Emergency illumination of objects in case of natural disasters and catastrophes is secured by three systems, which are removed from each other for 120° along the equator and completely embrace the Earth surface, except for the polar areas.

A satellite in the stationary orbit is almost constantly illuminated by the Sun. Its stay in the Earth shadow takes not more than 1% of the earth-rotation period, which determines high potency of the system.

While tracking, the mirror turns through 66? in 6 hours, that is, it rotates at the angular velocity of $\phi'=7.5'$/min (minutes of arc per minute).

The whole system can be supplied with power by solar batteries, which are permanently directed towards the Sun by the second guidance device 4 (FIG. 1).

Directing sensors usually consist of two sensing elements, electrically linked into a bridge circuit. Together with them, the system of solar orientation includes an all-round looking sensor to produce information to a low degree of accuracy sufficient for more precise sensors of the guiding device 4 to direct their fields of vision towards the Sun.

The system for lighting of an object is established on a gyrostabilized platform of a space vehicle. Every problem of the space vehicle flight control is handled by the control system. Together with the problem of a space vehicle attitude-control and stabilization, it is guidance of the guidance devices 3 and 4 towards different objects in response to a command from the Earth.

Signals, qualifying physical parameters of the flight, are received from the system of sensors.

Sensors of direction are used for attitude control. Stabilization of the space vehicle is performed by signals from the sensors of direction and by signals of gyroscopic pickups, which register position of the axes in space.

Reference parameters of the space vehicle flight can be loaded into the storage of an onboard computer, transmitted aboard by the ground stations through a command radio line or withdrawn from the pickups of the gyro-stabilized platform.

Comparison of actual flight parameters with the reference ones, detection of error signals and generating of correcting control signals are performed by an onboard computer.

The mirror 19 is rotated about two orthogonally related axes OX and OY with the aid of the actuators 46 and 48. A change in the attitude of the locating ring 110 is followed by the change in the attitude of the mirror 19. The external frame 99 of the second ring-shaped gimbal mount is fitted with the locating ring 110 with limiters and the internal pneumatic chamber 74. This chamber is pneumatically connected by radial tubes (hoses) 76 to the concentric external pneumatic chamber 75 and together with it makes a single pressure-tight cavity, which is jointed up to a source 77 of compressed gas. In transit, the chamber is empty and may be folded. Gas delivery will make the chamber take the form of a wheel. The external ring of the pneumatic chamber 75 can be a few tens of kilometers in radius. In advance, when still on the ground, the reflecting sheet 106 is attached to the pneumatic chambers 74, 75. With gas delivery from the source 77, the external ring of the pneumatic chamber starts pulling the reflecting sheet 106. The pneumatic chambers finally having taken the form of the wheel, the reflecting sheet 106 should take the form of a plane.

For attainment of strength, the sheet can have a kapron warp coated with the dielectric film 107 (e.g., fluorinated plastic), to which a reflecting metal coating 109 (e.g., aluminum) is applied.

When filled with gas, the collapsible radial hoses 76 take the form of tubes. They, to some extent, reinforce the pneumatic wheel. This is how the mirror 19 is constructed. With the aid of the actuators 46 and 48 the mirror 19 is rotated about the axes OX and OY to direct the reflected sunrays towards a ground object.

Because the solar disk has an angle of view equal to ψ, sunrays reflected by the mirror 19 diverge and illuminate the ground area considerably exceeding that of the mirror.

The mirror 19 may be given a spherical (concave) form. This allows one to concentrate sunrays on a small area and, thus, to increase the illuminance. For the purposes of defense, the focused sunrays can be used for setting fire to the enemy's ground objects. For peaceful purposes, energy of radiation can be transformed into electrical energy with the aid of solar batteries. If necessary, a spot beam following a spiral or any other prescribed trajectory, which depends on the voltage values generated by the quadrature generator 108 (FIG. 9), can intensify illumination of the surface like a floodlight.

To obtain a spherical specular surface, in addition to the reflecting sheet 106 (FIG. 6), the reflecting sheet 110 is used. Both reflecting sheets 106 and 110 are attached only to the pneumatic chambers 74, 75 and are not joined to the radial tubes 76. The internal pneumatic chamber 74 and the external pneumatic chamber 75 together with the reflecting sheets 106, 110 make a hermetically sealed chamber, which is joined to the source of vacuum (vacuum pump) 112. Pressure created by the source of vacuum 112 between the reflecting sheets in the chamber is lower, than that in the ambient outer space. It is due to an excess external pressure that the specular sheets are attracted to each other and their surface receives a spherical form. The sag value h can be calculated beforehand and taken into account when fixing the sheets to the internal pneumatic chamber 74. The inner edges of the sheets are brought together relative to the plane for a distance of 2h. If necessary, this spacing interval can also be changed within 0–2h by a command from the Earth.

Electrostatic forces can be used to obtain a spherical specular surface and for remote modification of its radius of curvature. For this purpose, the metal platings of the reflecting sheets 106, 110, are connected to the source 111 of emf (or of voltage). By varying the voltage, it is possible to control the force of electrostatic attraction of the sheets, and by this to perform remote focusing of the spherical mirror 19 and to control concentration of the luminous flux.

To create a spherical mirror, electrostatic forces and excess external pressure can be simultaneously applied as well.

Employment of both specular surfaces is also possible, for which it is necessary to turn them through 1106°.

In order that a flat mirror could be transformed into a spherical one, the internal pneumatic chamber 74 should be made of two sections pneumatically attached to each other by the corrugated elastic band 86. The pneumatic chamber 90 joined to the source 77 of compressed gas by a separate gas conduit (hose) 91 is installed inside this corrugated band 86. By varying pressure in the pneumatic chamber 90 one can remotely change the interval between two sections of the internal pneumatic chamber within the limits of from 0 to 2h. This is how the sag of the spherical surface of the mirror 19 and the radius of its curvature are changed.

The corrugated band 86 is topped with a clamp-shaped spring 89, but it is possible that the band itself be springy. In the normal conditions both sections of the internal chamber 74 are pressed against each other. With the start of gas delivery into the pneumatic chamber 90 inserted into the corrugated elastic band 86, the sections of the internal pneumatic chamber 74 move apart. At a definite pressure the specular sheets 106, 110 take the form of a plane. To prevent the sections of the chamber 74 from further moving apart, the locating ring 110 is provided with the end arresters serving this purpose.

To give the specular surface of the sheet a regular spherical form, the metal coating applied to the reflecting sheet 110 has the form of concentric rings 87. Each ring has an electric terminal of its own soldered to a metal bed.

By selecting the quantity, bandwidth and voltage applied to each ring, as well as the pressure in the third pneumatic chamber 90, we can create specular surfaces of any configuration and curvature.

Depending on the problem to be decided, the onboard computer by the ground command will change the voltage $V_i$ on the rings 87 and the pressure in the pneumatic chamber 90.

For more effective employment of the system, in the daytime the large-size mirror 19 can be used for a radio, television and telephone communication between ground objects. The mirror is used as a passive reflector. It is automatically established in the position that the normal n to the center of the mirror should coincide with the "mirror-radio beacon" direction. In this case, the maximum of the directivity lobe of the transmitting antenna is pointed at the mirror. The system works more effectively if the transmitter has a narrow directivity lobe, as that for laser-beam communication. Radiation of the transmitter falls on the mirror and, having been reflected by it, returns to the Earth. Owing to angular divergence of the transmitter's radiation, radiation reflected by the mirror covers a greater area. With a corner reflector placed in front of the target seeker 23 (FIG. 3) and the transmitter installed on a satellite-tracking platform of the type of the guidance device 5, the beam can be confined to several minutes of arc. Thus, the system can be used for laser beam communication between two ground objects, for which the target seeker 53 (FIG. 4) must keep tracking the second ground object. To achieve this purpose, the seeker 53 in addition to an optical sensor is equipped with radio-frequency range sensors designed similarly to those of the seeker 44. In order to establish a directional two-way laser beam communication between two ground objects, both transmitters should be installed on tracking platforms, with their radiation directed towards corner reflectors placed in front of the corresponding target seekers 44i and 53. Within the frequency range the transmitters should operate at different frequencies to exclude interference.

Changing between operational modes of the system is done in response to the ground commands delivered through a radio circuit. For this, the system is equipped with a commutation unit 10 (FIG. 1), with the aid of which the system is placed in one of four operational modes:

a) directing the laser beam towards a target with the aid of the mirror 19 (position I of the contacts 55, 56, 36 of the switch 37);

b) one- or two-way communication between two ground objects with the aid of the mirror 19 (position II of the contacts 55, 56, 36 of the switch 37);
c) illumination of a ground object by radiation of its own transmitter (the III position) reflected by the mirror 19;
d) illumination of a ground object by the solar radiation with the aid of the mirror 19 (position IV of the contacts 55, 56, 36 of the switch 37).

For exploiting the system in the "a" mode, a radio beacon should be placed at the center of a lighted ground object (e.g., a city). To reduce power of the radio beacon, the latter can be installed on a guidance device designed as the guidance device 3 (see FIG. 3).

The guidance device 3 is tracking the radio beacon, while the guidance device 4 is intended for tracking the solar disk.

These guidance devices 3 and 4 (FIG. 3) permanently keep the radio beacon and the center of the solar disk on the optic axes of the corresponding target seekers 44 and 53.

Two signals, proportional to the target angular coordinates $\Delta V_\alpha$ and $\Delta V_\beta$ in two planes of control are shaped at the outputs of the guidance devices.

These signals go to the inputs of the corresponding subtracting amplifiers 6 and 5. The subtracting amplifiers compare coming signals and generate difference signals $\pm\alpha=\Delta V_{\alpha_1}-\Delta V_{\alpha 2}$ and $\pm\beta=\Delta V_{\beta_1}-\Delta V_{\beta 2}$. These difference signals go respectively to the inputs 9 and 14 of the commutation unit 10. The inputs 15 and 16 of the commutation unit 10 are connected to the corresponding outputs of the guidance device 3. The inputs 17 and 18 of the commutation unit 10 are connected respectively to the outputs of the guidance device 4. In this case the outputs 21, 23, 47, and 49 of the commutation unit 10 are connected to the inputs of the corresponding actuators 20, 22, 46, and 48. The output 51 of the commutation unit 10 is connected to the output of the guidance device 4.

In the "b" mode the actuators 46 and 48 are kinematically coupled to the mirror 19. The mirror 19 is used for aiming solar rays at a ground object (a city) in night-time. The same mirror can be used as a passive reflector for communication between any two ground objects and for radiotelephone space communication in mountain areas. In this case, the mirror 19 is automatically set perpendicularly to the optic axis of the guidance device 3 which keeps tracking the radio beacon placed in the center of a lighted ground object (a city).

In the "c" mode the actuators 20 and 22 are kinematically coupled to the mirror 19. This small-size mirror is placed in the center of the coordinates, so that the zero point should coincide with the center of the mirror, and is used for aiming of a high-power laser beam. This mirror is made of beryllium bronze and cooled by liquid helium.

In the "d" mode of directing a laser beam towards an enemy's target, the latter is used as an object. The guidance device 4 is aimed at the laser (radiation source 2). On the guidance device 5 there is a laser, which may be given the form of a cylinder whose axis (radiation) coincides with the optic axis of the target seeker 44 of the guidance device 5. A light marker 44 or a radio beacon, which is coaxially placed in front of the laser so that the latter might be better distinguished against the ground surface.

Figure 4:
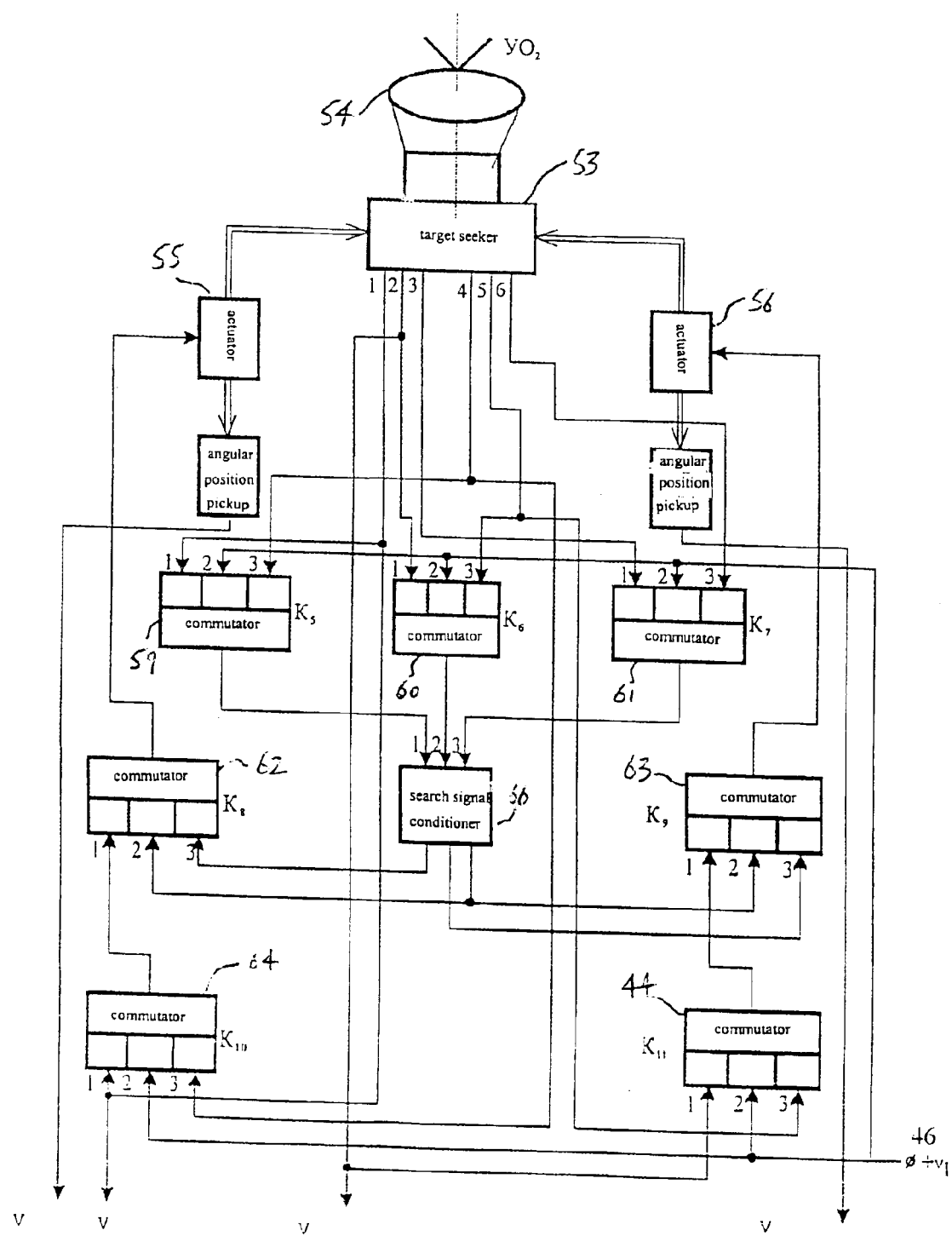
FIG. 4 is a block diagram of a third guidance device used in the system.

This determines employment of optical or radar sensors (transducers) of the target seeker 53 (FIG. 4). The first, second and third outputs are the outputs of the radar sensor, while the fourth, fifth and sixth ones are the outputs of the optical sensor.

By the ground command the radio receiver 33 (FIG. 2) with an antenna A shifts a three-contact switch to one of the four positions (I, II, III, IV). Depending on the position of the contacts 55, 56, 36 of the switch 37, the actuators 20, 22, 46, and 4B receive signals from the outputs of the subtracting amplifiers 6 and 11 or from the respective outputs of the guidance device 3. Besides, the contacts 55, 56, 36 of the switch 37 connects the commutation output 51 of the commutation unit 10 with the output of the source 59 of a unit signal $(+V_1)$ (position IV).

With the contacts 55, 56, and 36 of the contacts 55, 56, 36 of the switch 37 in the upper (I) position, the system works in the "a" mode. The outputs of the subtracting amplifiers 6 and 11 are connected, through commutators 31, 53, respectively, to the inputs of the actuators 20 and 22, respectively. The system controls the first central metal mirror 19.

In this case, at the output 51 of the commutation unit 10 there appears as a unit signal $+V_1$, which goes to the commutation input of the guidance device 4.

In this case the system is used for aiming a powerful laser beam at the target. The source 2 of radiation (a laser) is installed on the guidance device 5. By reducing control signals to zero in two planes, the guidance device 5 aims the laser at the light marker 66 (or a corner reflector), placed in front of the target seeker 53 of the guidance device 4.

The guidance device 4, in its turn, is aimed at a light marker (a radio beacon) placed in front of the source 2 (laser). When the output signals from the target seekers 53 and 44 of the guidance devices 4 and 5 become zero, their optic axes coincide, and the laser beam hits Point 0. After the error has been minimized, the optic axis of the target seeker 44 of the guidance device 3 comes to coincide with the direction "0 object". Difference signals from the outputs of the subtracting amplifiers 6 and 11 having been reduced to zero by the actuators 20 and 22, the mirror 19 takes a next position. The normal n in the Point 0 (origin of the coordinates) becomes a bisector of the angle between optic axes of the target seekers 44 and 53 of the guidance devices 3 and 4. The incident laser beam, after having been reflected by the mirror 19, hits the target 1.

To start a giant-pulse laser, an excitation pulse should be applied at the instant when the output signals of all target seekers 44 and 53 of the guidance devices 3, 4, and 5 and of the subtracting amplifiers 6 and 11 come to zero. The outputs of the subtracting amplifiers should be connected to the AND gate 62 provided with the NOT inverter 63. A unit signal from the output of the inverter 63 excites the laser. Information about zero values of the signal at the outputs of target seekers 44 and 53 and of the subtracting amplifiers 6 and 11 may be transmitted through radio or laser communication.

The middle position (II) of the contacts 55, 56, and 36 of the contacts 55, 56, 36 of the switch 37 corresponds to the zero value of the signal at the inputs 60, 61 of the commutators 31 and 53. In this case, the outputs of the subtracting amplifiers 6 and 11 are switched to the inputs of the actuators 46 and 48, i.e., the system controls the film mirror 19.

The contacts 56 and 36 of the contacts 55, 56, 36 of the switch 37 connect the outputs of the commutators 31 and 53 to the inputs of the actuators 46 and 48. These actuators minimize error signals coming to the corresponding inputs of the commutators 31 and 53 from the outputs of the subtracting amplifiers 6 and 11.

By turning the film mirror 19, the system can provide space communication between two ground objects, which have to be equipped with radio beacons. The guidance device 3 is pointed to the object (radio beacon) 1, while the guidance device 4, to the second radio beacon. The mirror 19 is automatically adjusted in such a way that a beam, radio-frequency radiation in the VHF or microwave range or a laser beam after having been reflected by the metal coating of the mirror 19 hits the second ground object, and vice versa. With a view to secrecy the small mirror 19 can be used. This is how the space communication between two ground objects can be carried out.

With the contacts 55, 56, 36 of the switch 37 in the third (III) position, the unit signal +$V_i$ from the source output 59 goes to the inputs 60 and 61 of the commutators 31 and 53 which pass the signals from the corresponding outputs of the first guidance device 3 to the outputs 15 and 16 of the commutation unit 10. These signals from the corresponding outputs of the target seeker 44 of the guidance device 3 go to the inputs of the actuators 46 and 48 which follow to indicate them. In this case the mirror 19 becomes perpendicular to the optic axis of the guidance device 3 directed towards the object 1 (radio beacon).

With the contacts 55, 56, and 36 of the radio-controlled switch 37 in the fourth (IV) position, the system works in the "d" mode. In this case, the unit voltage +$v_I$ from the output of the unit 59 goes to the output 51 of the commutation unit 10. This output is connected to the input of the guidance device 4.

The fourth operation mode "d" demands that the guidance device 4 should have a target seeker 53 (FIG. 4) with the sensors working within both the optical range (the outputs 1, 2, 3), and the radio frequency band (the outputs 4, 5, 6).

In comparison with the guidance devices 3 and 5 (FIG. 3), the guidance device 4 (FIG. 4) has the additional commutators 59, 60, 61, 62 and 63. With the zero unit signal at the commutation input the first, second and third outputs of the target seeker 53 are connected to the corresponding inputs of the search signal conditioner 60 through commutators 59, 60 and 61. Besides, the first and second outputs of the target seeker 53 are connected to the first inputs of the commutators 62 and 63 through the commutators 64, 44.

With the zero signal at the inputs of the commutators 51 and 52, the first and second outputs of the target seeker 44 are connected respectively to the inputs of the actuators 46 and 47.

Thus, with a zero signal at the commutation input of the guidance device 4, it works in the same way as the guidance devices 3 and 5 (FIG. 3).

In the lower position (IV) of the contacts 55, 56, and 36 of the radio-controlled switch 37 a unit signal +$V_1$ goes to the commutation input of the guidance device 4.

In this case, the commutators 59, 60, 61 let signals from the respective fourth, fifth and sixth outputs of the target seeker 53 pass to the input of the search signal conditioner 66.

At the same time, the commutators 64 and 44 let signals from the fourth and the fifth outputs of the target seeker 53 of the guidance device 4 pass to the first inputs of the commutators 62 and 63.

In this case the optic sensors of the target seeker 53 of the guidance device 4 operate.

Target seekers 44 of the guidance devices 3 and 5 work in the radio-frequency range.

As for the rest, the principles of operation of the guidance devices 3, 4, and 5 coincide.

If it is necessary to work in the optical range, the guidance devices of the type of those under Ref. No. 4 can be used, with a unit signal +$V_i$ given to the commutation input.

The object 1 comes into the field of vision of the guidance device 3. When the object does not coincide with the optic axis of the target seeker 44 or, control signals at the output of the target seeker 44 are other than zero.

Difference signals from the target seeker 44 go to the actuators 46 and 47 (servomotors) to be executed. The brackets 109 and 110 together with the corresponding servomotors 46 and 47 turn the target seeker 44 about the axes OX and OY. The optic axis of the target seeker 44 is always directed towards the Point 0, i.e., towards the center of the sphere on which the target seeker 44 moves. Difference signals from the target seeker 44 have been reproduced, the target seeker 44 takes such a position that its optic axis coincides with the direction towards the object (radio beacon) 1. When a system for lighting of an object is established on a mobile object, e.g., onboard a flight vehicle, it should be placed on a gyro-stabilized platform in order to provide gyroscopic decoupling. Angular position of the target seeker 44 with respect to the platform in two planes of control can be measured with the aid of the angular position pickups 48 and 49 (synchro transmitters or potentiometers).

For guiding a pencil-beam antenna of the automatic direction-tracking system the method of radio direction finding is used (U.S. Pat. No. 3,946,233).

In the radio-frequency range, two antennas of the automatic direction-tracking system are used instead of the target seekers 44 and 53.

A transmitting antenna of the radar station is placed in the center of a lighted ground object (e.g., a city) and radiates electromagnetic waves into the ambient space. To reduce power of the automatic radio direction-tracking device (automatic direction-tracking system), the target seeker 44 may be equipped with a corner reflector 45.

The corner reflector consists of three reflective plates adjusted perpendicularly to each other. In the corner reflector, incident energy from the radar station, having been two or three times reflected by the surfaces of the three plates, is reverted in the direction the radiation has come from. Thus, a small-sized corner reflector is capable of creating reflection of high intensity (U.S. Pat. No. 3,946,233).

The transmitting antenna of the radar station with the aid of an automatic direction-tracking device is oriented to the corner reflector and points electromagnetic waves thereto. The first automatic direction-tracking device in turn, directs the axis of the target seeker 44 (which coincides with the equisignal direction of the automatic direction-tracking device) towards the source of radiation, that is, a first radar station.

The first and third automatic direction-tracking devices can be designed to use the method of conical scanning of an antenna beam or the monopulse measuring of angular coordinates; the latter guarantees a higher degree of accuracy and allows of using both pulse and continuous energy radiation (U.S. Pat. No. 3,946,233).

It is known that with the first method used, deviation of an object from an equisignal direction is accompanied by the maximum beam alternately coming nearer to the object or receding therefrom. Owing to this, impulses of return signals are modulated in amplitude with a conical-scan frequency of the beam, while modulation depth depends on the value of the error. The curve, which turns tops of reflected pulses, is an error signal. The initial phase of the envelope curve depends on how far the object deviates from the equisignal position in azimuth and angle of elevation. Automatic tracking lies in automatic rotating of the antenna axis until the error signal becomes zero. When error signals of the both of the automatic direction-tracking devices become zero, the equisignal lines of transmitting and receiving antennas come to coincide and the axis of the target seeker 44 is now directed towards the radiating antenna of the first radar station.

The target seeker 53 is directed towards the Sun with the aid of the brackets 95 and 94 and the actuators 55 and 56 (servomotors) of the guidance device 4 kinematically coupled thereto. Angular position of the target seeker 53 with respect to the gyro-stabilized platform is measured by the angular position pickups 57 and 58. When the target seeker 53 turns about the axes OX and OY, its own optic axis always goes through the origin of OXYZ coordinates.

CCD-rulers used in the target seeker for aiming at the Sun are not damaged if locally overlit and do not get out of order even at a thousandfold increase of a luminous flux in comparison with the flow of saturation. To increase noise immunity of the Sun seeker, CCD-rulers' lenses are further equipped with optical filters, e.g., of the IRS-7 type, which transmit radiation only of the near-infra-red region, and with neutral filters, that diminish brightness of the solar disk image to required values.

Whichever position the target seekers 44 and 53 moving on the surface of the sphere may take, their optical axes intercross at the center of the O sphere. The mirror 19 is installed on a gimbal mount. The gimbal mount, which consists of an internal frame 98 and an external frame 99 kinematically coupled to the respective actuators (servomotors) 25 and 27, provides for rotation of the mirror about the axes OY and OX.

To direct incident sun rays, which coincide with the optical axis of the target seeker 53) along the "O-target" line (coincident with the optic axis of the target seeker 44), subtracting amplifiers (comparators) 6 and 11 are used.

The inputs of the subtracting amplifier 6 are connected to the outputs of the guidance devices 3 and 4. In position I of the switch 37 the outputs of the subtracting amplifier 6 are connected to the inputs of the actuators 20 which provide rotation of the mirror 19 about the OY axis. The inputs of the subtracting amplifier 11 are connected to the respective outputs of the guidance devices 3 and 4. The output of the subtracting amplifier 11 is connected to the input of the actuators 22 which provide rotation of the mirror about the OX axis.

The subtracting amplifiers (comparators) 6 and 11 generate difference signals $\Delta U = U_i - U_2$, where $U_i$ and $U_2$ are voltage values taken off from two angular position pickups 46, 47, and 57 and 58 (e.g., potentiometers) of the guidance devices 3 and 4. Movable contacts of the potentiometers are kinematically coupled to brackets, with the aid of which the target seekers 44 and 53 are directed towards the object 1 and the radiation source 2. The subtracting amplifier is built around an operational amplifier. The difference signal $\Delta U$ at the output of the subtracting amplifier is proportional to the difference between the angles $\Delta\alpha$ (or $\Delta\beta$) in two planes of control (XOZ and YOZ). The difference signal $\pm\Delta U$ goes to the respective actuators 20 and 22 which rotate the mirror 19 about the OX and OY axes to reduce error signals to zero.

When the object of the target seeker 44 comes out of sight, the system starts operating in the search mode. In this case, the inputs of the actuators 46 and 47 are connected to the outputs of the search signal conditioner' 50 through the commutators 51 and 52.

Similarly, with the source 2 of radiation out of sight of the guidance devices 3 and 4, the inputs of the actuators 55 and 56 are connected to the outputs of the search signal conditioner 66.

The search signal conditioners 50 and 66 of the guidance devices 3 and 4 shape two signals of ramp amplitude in phase quadrature (sin $\phi$, cos $\phi$). Having received such signals, the actuators 46 and 47 (55 and 56) rotate target seeker 44 (53) about the OX and OY axes so that the optic axes of the target seekers 44 (53) are scanned along a spiral sweep-trace.

When the Sun comes into the field of vision of the target seeker 53, its radiation is registered with the aid of opto-electronic transducers. Its outputs send sync pulses from the outputs of the synchronizing signal generator to the sync inputs 104 of the search signal conditioner 50 (66), while the inputs 102 and 103 of the search signal conditioner receive normalized signals coming from the outputs of the target signal detectors. Having received both signals from the outputs of the target signal detectors, the system goes into the tracking operation. The commutators 62, 63, 64, and 65 connect inputs of the actuators 55 and 56 to the outputs of the target seeker 44 of the guidance device 3.

Figure 9:
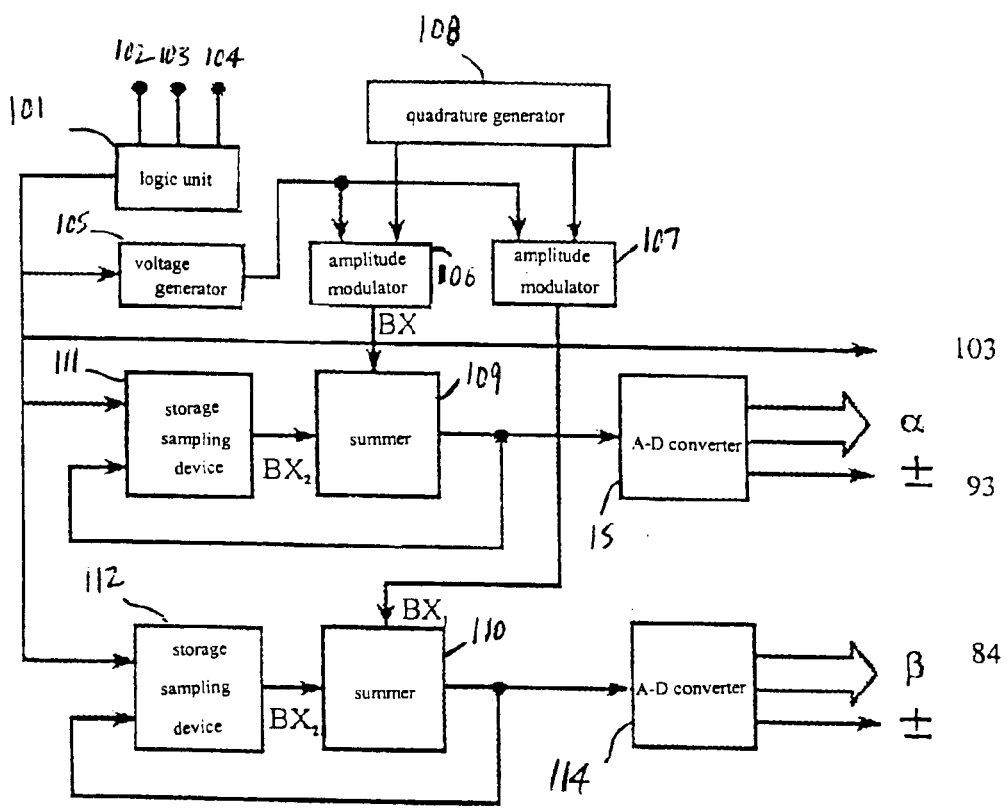
FIG. 9 is a functional flow chart of the searching signals conditioners.

The search signal conditioners 50 and 66 functions as follows (FIG. 9).

If there is no target pulse in the interval between two successive sync pulses (at least at one of the data inputs), then at the output of the logical set 101 there appears a level of the logical unit which prevents recording new information in the devices 111 and 112 of storage sampling 112 (operation of the logical set will be described below). At the instant of changeover at the output of the logical unit 101 from zero to one, that is, along the pulse leading edge, the voltage at the output of the generator 105 of linearly varying voltage) becomes equal to zero and starts increasing linearly (from zero).

The output voltage of the generator 105 modulates harmonic signals from the outputs of the quadrature generator 108 by means of modulators 106 and 107, with the signals at the outputs of the quadrature generator 108 being 90-deg out of phase. This allows of having harmonic signals of ramp amplitude in phase quadrature (sine and cosine) at the outputs of the amplitude modulators 106 and 107.

At the outputs of the summers 109 and 110 there appear voltage values equal to the sum of voltage values at the outputs of the respective modulators 106 and 107 and the sample-and-storage devices 111 and 112, i.e., $U_3 + U_4 = U_{\Sigma 1}$, where $U_3$, $U_4$, $U_{\Sigma 1}$ are voltage values at the respective outputs of the device 112, modulator 107, and the summer 110. The analog-digital converters 113 and 114 at the outputs of the summers 109 and 110 convert the voltage at the outputs of the summers 109 and 110 into a respective digital signal. When there are demanded from the search signal conditioners 50 and 66 control search signals in an analog form, the analog-to-digital converters are not necessary.

Space scanning can be achieved by angular position pickups of the signal from the outputs of the summers 109 and 110 (by means of the analog-to-digital converters 113 and 114) to the actuators 46, 47 (55, 56) of the guidance device 3 (4) which provide rotation of the target seeker 44 (53) in two mutually perpendicular planes about the OX and OY axes of the OXOY coordinate system connected to the gyro-stabilized platform. Position taken by the start of the spiral depends on the voltage values at the outputs of the sample-and-storage devices 111 and 112, i.e., these values are proportional to the tangents of the angular coordinates.

If a radio beacon or the Sun comes into the field of view of the target seeker 44 (53), the radiation is recorded with the aid of detectors or optoelectronic converters. In this case, at the outputs of the target detectors there appear target detection pulses DE, A, #3,412,076) which will assure the level of logical zero at the output of the logical unit 101. At that instant, instantaneous (current) voltage values are recorded at the outputs of the corresponding summers 109 and 110 along the trailing edge of the output of the logical unit 101 in the devices 111 and 112, and zero voltage is provided at the output of linearly varying voltage generator 105. As long as the target is across the beam pathway, the logical unit 101 will shape "I", thus providing zero voltage at the output of the generator 105, while at the output of the summers 109 and 110 voltage remains the same, since the devices 111 and 112 store the voltage values produced at the outputs of the summers 109 and 110 at the instant of appearing "0" at the output of the logical unit 101 (i.e., $U_3=U_{\Sigma 1}$), and "0" at the output of the generator 105 (i.e., $U_4=0$).

This is how the stationary position of the mirror 19 is obtained. When the target leaves the field of vision of the target seeker 44 or 53, the level of the logical unit appears at the output of the logical set 101, the generator 105 starts generating ramp voltage, recording in the devices 111 and 112 is blocked and the process (spiral sweep) starts, the center of the spiral being in the straight line which was crossing the target at the instant when the target was leaving the field of vision of the target seeker.

If there is no target in the field of view of the target seeker and the voltage at the output of the generator 105 has reached some preset value (which is determined by the field of vision of the system), the generator 105 resets the output voltage and the entire above-mentioned process starts anew.

The quadrature generator 108 can be designed as shown in FIG. 5.12 on page 137 (cf. The textbook by A. G. Aleksenko, K. A. Kolombet, G. I. Starodub, "Application of precision analog IC", "Sovetskoe radio" Publishers, Moscow, 1980), the sample-and-storage devices, as in FIG. 3.1 on page 77 (cf. op. cit.). To prevent the sample-and-storage devices and the summers from inversion, they should be connected in series with inverters that have a gain factor equal to 1 (FIG. 1.8b, page 18 (cf. op. cit.).

The analog-to-digital converter can be realized in a circuit design shown in the textbook "Linear integral circuits" by V. L. Shilo, "Sovetskoe radio" Publishers, Moscow, 1979, FIGS. 27, 24, 23, page 458 (in Russian).

For the modulators 106 and 107 it is possible to use standard amplitude modulators, with their control inputs connected to the output of the logical unit 101 and carrier frequency inputs, to the corresponding outputs of the quadrature generator 108.

The generator 105 may be built around a standard generator of the saw-tooth growing voltage type.

In the above-mentioned shaper it is possible to use chips of the K153UD2, K161UD7, K161UD8, K154UD2 type, insulated-gate field-effect transistors, capacitors with a small loss tangent, etc.

The logical unit 101 can be designed as shown in FIG. 10. It functions as follows.

A synchronizing pulse, which has come at the input 103 through the inverter 121, sets the flip-flops 117 and 118 to zero along the pulse trailing edge, since K155TM2 chip-based flip-flops made use of herein, are switched at the changeover from "0" to "1".

Along the leading edge of the sync pulse, information from the above-mentioned flip-flops 117 and 118 is copied into the flip-flops 119 and 120 (these flip-flops are also based on the K155TM2 chips). The four flip-flops operate in this way because pulses that come to their sync inputs are out of phase.

The flip-flop 117 (118) will be in the unit state provided that within the current period between two successive sync pulses there is a circuit pulse from the corresponding target detector that comes to the input 102). Otherwise, the flip-flop stays in the zero state. After arrival of the sync pulse, this information is copied into the third flip-flop 119 (120).

Thus, a logical unit appears at the direct input of the flip-flop 119 (120) on condition that within the given period between two successive sync pulses there is an object pulse from the output of the corresponding target detector; otherwise the signal takes the zero value.

The zero state of either of the two flip-flops 119 and 120 results in the level of a logical zero at the output of the logical unit. This is provided by the element 122 which may be based on a K155LI1 chip.

The inverters can be based on chips of the K155LN1 type.

In the systems for lighting of an object, according to the invention, it is possible to use gyroscopic, electromechanical or electrohydraulic actuators. The first ones seem preferable, as they are inertialess (cf. the textbook "Infrared systems", by L. Z. Kriksunov and I. F. Usoltsev "Sovetskoe radio" Publishers, Moscow, 1968, pp. 157–239 (in Russian). In this case the target seeker's axis deviates from the direction required, correctional sensors, which are connected to the axes of the frames and receive signals, develop torques that make the gyro process in the direction of the object.

By measuring the strength of current in windings of correlation sensors (the value of the moments) it is possible to determine projections of the angular velocity vector of the observing line on two mutually perpendicular directions [1]. Wipers of potentiometer transducers fixed on the rotation axes of the gimbal joint frames will aid to determine angular coordinates in respect to the platform, on which the gyroscope is installed. In this case, sensor cases should be rigidly attached to the platform (cf. the textbook "Infrared systems", by L. Z. Kriksunov and I. F. Usoltsev "Sovetskoe radio" Publishers, Moscow, 1968, pp. 157–239 (in Russian). Having stopped the wipers of potentiometer transducers on the axes of rotation of the frames of a gimbal unit, one can find the angular coordinates with respect to the platform on which the gyroscope is held in position. In such a case the casings of the transducers should be locked-in with the platform (cf. the textbook "Infrared systems", by L. Z. Kriksunov and I. F. Usoltsev "Sovetskoe radio" Publishers, Moscow, 1968, pp. 157–239 (in Russian).

In electromechanical autotracking systems direct current engines can be used as servomotors (cf. the textbook "Infrared systems", by L. Z. Kriksunov and I. F. Usoltsev "Sovetskoe radio" Publishers, Moscow, 1968, pp. 157–239 (in Russian). Taking into account values and signs of output signals, servomotors correct misalignments between the target seekers' axes and the direction towards the object. Wipers of potentiometer transducers or synchro transmitters fixed on rotation axes of the frames of the coordination unit produce signals, which determine angular position of the target seekers in relation to the axis of the controlled object.

To obtain a signal proportional to angular velocity of the observing line, tachogenerators are used, kinematically coupled to the shafts of servomotors. The same tachogenerators can be used as elements of vanishing feedback. Information about the angular position and angular velocity of the servo drive's observing line is used for control of an object. Signals proportional to the angular position of the coordinators are received from potentiometers or synchro transmitters fixed on the rotation axes of the gimbal mount frames, while signals proportional to the angular velocity of the observing line come from resistors inserted into the windings circuit of correction torque motors of the gyroscopic drive or from tachogenerators, kinematically coupled to servomotors of the electromechanical drive.

In addition to automatic lighting of ground objects the system provides information about the angular position of the target in relation to the OZ-axis. For this purpose, information about the angular position of a ground object is obtained from the outputs of the angular position pickups 48 and 49 (FIG. 3). The system of the present invention in comparison with the prototype, allows of automatic illumination of ground objects from outer space. It also permits increasing the accuracy of measuring angular coordinates of the target, since the beam is aimed at the center of the target image.

What is claimed is:

1. A system for lighting an object comprising:
   a) a radiation source;
   b) a first guidance device optically connected to the object;
   c) a second guidance device;
   c) a first subtracting amplifier having a plurality of inputs and at least one output, said first subtracting amplifier in communication with said first guidance device;
   d) a second subtracting amplifier in communication with said first guidance device, and in communication with said second guidance device;
   e) a commutation unit in communication with said first guidance device, said second guidance device said first subtracting amplifier and said second subtracting amplifier;
   f) at least one actuator in communication with said commutation unit;
   g) at least one second actuator in communication with said commutation unit;
   h) at least one third actuator in communication with said commutation unit;
   i) at least one fourth actuator in communication with said commutation unit;
   j) a first mirror in communication with and controlled by said at least one actuator and said at least one second actuator; and
   k) a second mirror in communication with and controlled by said at least one third actuator and said at least one fourth actuator wherein said first and said second mirror are controlled by said actuators so that the system can light an object by reflecting said radiation source.

2. The device as in claim 1, wherein said commutation unit comprises a first commutator and a second commutator wherein at least one input of said first commutator unit and at least one input of said second commutator unit are connected in parallel with each other, the system further comprising a radio receiver; a radio controlled switch, said switch having three contacts and four positions, wherein said first, second, and third contact are in communication with said radio receiver, wherein said first, second and third contacts are switchable to first, second, third and fourth positions, wherein said second and third contacts are switchable into said second, third and fourth positions, wherein said contacts are connected in parallel;
   wherein said commutation unit is in communication with said first commutator via said radio controlled switch;
   wherein said commutation unit is in communication with said second commutator via said radio controlled switch;
   a unit signal source coupled to said parallel inputs of said first and said second commutators in a third position of said contacts, and in communication with said commutation unit when said contacts are in a fourth position;
   an inverter;
   a radio transmitter;
   an AND gate in communication with said commutation unit wherein said AND gate is in communication with said radio transmitter via said inverter.

3. The system as in claim 1, wherein said second guidance device comprises:
   a target seeker having a plurality of outputs;
   a light marker disposed on said target seeker;
   at least one actuator in communication with and kinematically controlling said target seeker;
   at least one second actuator in communication with and kinematically controlling said target seeker;
   a first angular position pickup kinematically coupled to said at least one actuator and having an output forming an output for said second guidance device;
   a second angular position pickup kinematically coupled to said at least one second actuator and having an output which forms an output for said second guidance device;
   a search signal conditioner having a plurality of inputs and a plurality of outputs;
   a first commutator in communication with said target seeker and in communication with said search signal conditioner;
   a second commutator in communication with said target seeker and in communication with said search signal conditioner;
   a third commutator in communication with said target seeker and also in communication with said search signal conditioner;
   a fourth commutator in communication with said search signal conditioner and in communication with said at least one actuator;
   a fifth commutator in communication with said search signal conditioner and also in communication with said at least one second actuator;
   a sixth commutator in communication with said target seeker and in communication with said fourth commutator;
   a seventh commutator in communication with said target seeker and in communication with said fifth commutator;
   wherein said first, second, third, sixth and seventh commutators are connected in parallel with each other and forming an input of said second guidance device.

4. The system as in claim 1, wherein said first guidance device comprises:
   a target seeker;
   at least one first actuator in communication with said target seeker for kinematically controlling said target seeker
   at least one second actuator in communication with said target seeker for kinematically controlling said target seeker;
   a first angular position pickup in kinematic communication with said at least one actuator and having an output forming a first output for said first guidance device;
   a second angular position pickup in kinematic communication with said at least one second actuator and having an output forming a second output for said first guidance device;
   a search signal coordinator having a plurality of inputs and outputs and in communication with said target seeker;
   a first commutator having a plurality of inputs and a plurality of outputs;
   a second commutator having a plurality of inputs and a plurality of outputs wherein said first and said second commutators each include at least one input that is connected in parallel with each other and also to said search signal coordinator.

5. The system as in claim 4, wherein said search signal conditioner comprises:
   a) a logical unit in communication with said search signal conditioner;
   b) a generator of linearly varying voltage in communication with said logical unit;
   c) a first modulator having a plurality of inputs and at least one output;
   d) a second modulator having a first and a second input and an output wherein said first modulator and said second modulator having inputs coupled in parallel to each other;
   e) a quadrature generator in communication with said first modulator and said second modulator;
   f) a first sampling and storage device for receiving record permitting input;
   g) a second sampling-and-storage device having a record permitting input;
   h) a data input and output wherein said record permitting inputs of said first and said second sampling and storage devices connected in parallel to each other and to said logical unit;
   i) a first summation element in communication with said first modulator and with said first sampling and storage device;
   j) a second summation element in communication with said second modulator and with said second sampling-and-storage-device;
   a first analog to digital converter in communication with said first summation element and with said search signal conditioner; and
   a second analog to digital converter in communication with said second summation element also in communication with said search signal conditioner.

6. The system as in claim 1, further comprising:
   a first and a second bracket which are kinematically coupled to first guidance device of said target seeker;
   a third and a fourth bracket kinematically coupled to said second guidance device;
   a first gimbal mount;
   an internal frame coupled to said gimbal mount;
   a mirror installed on said first internal frame of said first gimbal mount;
   an external frame coupled to said first gimbal mount wherein said external frame is kinematically coupled to said second actuators of said system;
   a second gimbal mount having an internal and an external frame kinematically coupled to said at least one third and said at least one fourth actuator of said system;
   a concentric ring of said second gimbal mount, said concentric ring being coupled to said external frame of said second gimbal mount;
   a mirror coupled to said concentric ring on said second gimbal mount.

7. The system as in claim 6, further comprising radial tubes, a source of compressed gas, said second mirror having a plurality of internal and external pneumatic chambers pneumatically communicating with each other and with said source of compressed gas, wherein said communication is established through said radial tubes arranged concentrically with respect to said concentric ring of a second gimbal mount, wherein said second mirror has a first reflecting sheet associated with said internal and external pneumatic chambers of said radial tubes said first reflecting sheet having an elastic dielectric film and wherein a light reflecting layer of said first reflecting sheet is applied to said elastic dielectric film.

8. The system as in claim 1, further comprising a third guidance device, wherein said radiation source is in the form of a laser and further comprising a third guidance device, having an excitation circuit of said laser in communication with said third guidance device and in communication with said laser.

9. The system as in claim 8, wherein said laser excitation circuit comprises a radio receiver, a remotely controlled switch connected to said radio receiver, a unit signal source having an output; a first AND gate having a first input coupled to said output of said unit signal source through said remotely controlled switch, an inverter in communication with said AND gate, a second AND gate in communication with said laser excitation circuit, and with said inverter.

10. The system as in claim 8, further comprising an emf source having opposite poles, a second reflecting sheet of said mirror disposed at a specified distance from an input of said inverter.

11. The system as in claim 10, wherein said first and said second reflecting sheets in combination with said external pneumatic chambers form a vacuum and pressure tight cavity.

12. The system as in claim 11, further comprising a corrugated elastic band and wherein said internal pneumatic chamber has a first and a second section pneumatically communicating with each other and interconnected through said corrugated elastic band wherein said first and said second ends are displaceable relative to each other; a plurality of sources of controlled voltage, wherein said metallic layer of said second reflecting sheet appearing as concentric rings that are insulated from each other and respectively connected to said plurality of sources of controlled voltage.

* * * * *